US007739805B2

(12) United States Patent
Vary

(10) Patent No.: US 7,739,805 B2

(45) **Date of Patent: *Jun. 22, 2010**

(54) SNAP LINE AND METHOD

(76) Inventor: William J. Vary, 1434 W. 6$^{th}$ St., Nevada, IA (US) 50201

( * ) Notice: Subject to any disclaimer, the term of this patent is extended or adjusted under 35 U.S.C. 154(b) by 0 days.

This patent is subject to a terminal disclaimer.

(21) Appl. No.: 12/367,726

(22) Filed: Feb. 9, 2009

(65) Prior Publication Data

US 2009/0139103 A1 Jun. 4, 2009

Related U.S. Application Data

(60) Division of application No. 11/828,912, filed on Jul. 26, 2007, now Pat. No. 7,488,379, which is a continuation of application No. 10/684,243, filed on Oct. 13, 2003, now Pat. No. 7,367,130.

(51) Int. Cl.
*B44D 3/38* (2006.01)
*C09D 1/00* (2006.01)

(52) U.S. Cl. ......................... 33/414; 33/413; 106/31.01

(58) Field of Classification Search ........... 33/413–414, 33/333–334, 758–759, 339, 354, 369, 391, 33/756; 106/31.01, 31.09
See application file for complete search history.

(56) References Cited

U.S. PATENT DOCUMENTS

| | | | | | |
|---|---|---|---|---|---|
| 997,831 | A | * | 7/1911 | Kiso | 33/414 |
| 2,398,805 | A | * | 4/1946 | Pomeroy | 33/414 |
| 3,672,974 | A | * | 6/1972 | Tomlinson | 427/434.7 |
| 3,876,487 | A | * | 4/1975 | Garrett et al. | 156/390 |
| 4,792,357 | A | | 12/1988 | Bier | |
| 5,465,494 | A | * | 11/1995 | Johnston | 33/414 |
| 5,470,029 | A | * | 11/1995 | Dufour | 242/394 |
| 5,514,176 | A | * | 5/1996 | Bosley, Jr. | 623/1.15 |
| 5,683,055 | A | * | 11/1997 | Dufour | 242/394 |
| 6,079,112 | A | * | 6/2000 | Love | 33/414 |
| 6,203,602 | B1 | * | 3/2001 | Rangell | 106/31.01 |
| 6,345,448 | B1 | | 2/2002 | Chontos | |
| 6,578,274 | B1 | | 6/2003 | Tango, Jr. et al. | |
| 6,915,587 | B1 | | 7/2005 | Scillia et al. | |
| 7,367,130 | B2 | * | 5/2008 | Vary | 33/414 |
| 7,488,379 | B2 | * | 2/2009 | Vary | 106/31.01 |
| 2002/0026723 | A1 | | 3/2002 | Savalla | |
| 2003/0221325 | A1 | | 12/2003 | Dekort | |
| 2005/0076520 | A1 | * | 4/2005 | Vary | 33/414 |
| 2006/0122323 | A1 | | 6/2006 | Dumont et al. | |
| 2006/0157895 | A1 | * | 7/2006 | Watling | 264/333 |
| 2006/0194007 | A1 | | 8/2006 | Ishii et al. | |
| 2007/0289495 | A1 | | 12/2007 | Cray et al. | |
| 2008/0016710 | A1 | * | 1/2008 | Vary | 33/414 |
| 2008/0236442 | A1 | * | 10/2008 | Spaulding et al. | 106/31.01 |
| 2008/0295347 | A1 | * | 12/2008 | Braham | 33/414 |

FOREIGN PATENT DOCUMENTS

JP S58-120519 7/1983

* cited by examiner

*Primary Examiner*—Yaritza Guadalupe-McCall
(74) *Attorney, Agent, or Firm*—Moore & Hansen, PLLP

(57) ABSTRACT

A snap line for use in applying powdered material to a surface. The line comprises at least one strand of material that has been coated with water repellent material. The line may be used in conjunction with powder that has also been coated with water repellent material. The line and the powder enable a user to apply lines to wet or damp surfaces in a normal fashion.

21 Claims, 1 Drawing Sheet

SNAP LINE AND METHOD

RELATED APPLICATIONS

This application is a Divisional of U.S. application Ser. No. 11/828,912, filed Jul. 26, 2007, now U.S. Pat. No. 7,488,379 which was a Continuation of U.S. application Ser. No. 10/684,243, filed Oct. 13, 2003, now U.S. Pat. No. 7,367,130, both of which are hereby incorporated by reference.

FIELD OF THE INVENTION

The present invention relates to construction equipment. More particularly, the present invention relates to equipment that is used to lay out dimensional or building lines for workers in the construction industry.

BACKGROUND OF INVENTION

Snap lines have been used in the construction industry for many years for laying out building or dimensional lines. They are easy to use, accurate, and inexpensive. Typically, a snap line is tautly held adjacent or slightly above a surface that is to be marked. The line is then pulled away from the surface and released so that it strikes against the surface, leaving a residual line of powdered material, such as chalk. Over the years, snap line technology has evolved; powdered material is now available in colors other than blue, and housings are better able to retain and protect the powdered material from the elements.

One thing that has not changed over the years, however, is the use and operation of the snap line. That is, the snap line must still be positioned adjacent or slightly above a surface to be marked, pulled away, and then released so that it strikes against the surface to be marked. This works quite well for most surfaces. However, a drawback with existing snap lines is that they are ineffective when weather conditions are less than ideal.

As one may expect, conventional snap lines often do not operate as intended when conditions are wet or damp. Often, the powdered material adheres to the snap line and does not release when the line strikes the surface. Moreover, if some of the powdered material does manage to release from the line upon impact, it does not easily transfer to a surface to be marked, and if transfer does occur, the powdered material can be easily smeared and/or washed away. Thus, whenever wet conditions exist, layout work is essentially halted. This can be problematic in areas where wet conditions such as precipitation and high humidity are common.

SUMMARY OF THE INVENTION

A snap line for use in applying powdered material to a surface. The line comprises at least one strand of material that has been treated with water repellent material. The water repellant material may be applied to the line by conventional techniques and technologies, such as spraying and submersing. The line may be used with existing powdered materials such as the various colored chalks now in use, or it may be used in conjunction with powdered material that has also been treated with water repellent material. In combination, the treated line and powdered material enable a user to apply lines to wet or damp surfaces, or surfaces with shallow puddles thereon in a normal fashion. Advantageously, the treated line and/or powdered material may be used with most existing snap line.

Certain objects, features, and advantages of the present invention will become apparent from the following detailed description thereof taken in conjunction with the accompanying drawings, wherein like reference numerals designate like elements throughout the several views.

DETAILED DESCRIPTION OF THE INVENTION

Figure 1:
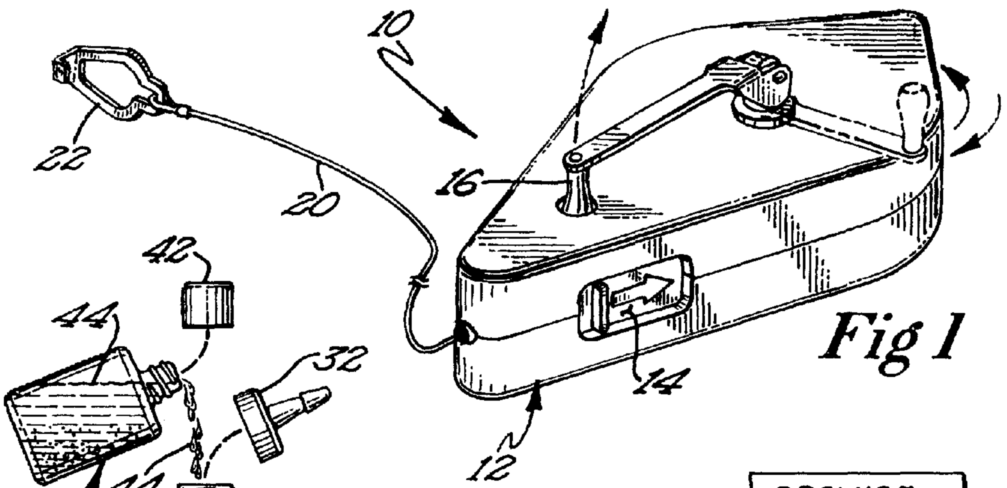
FIG. 1 is a perspective view of a snap line apparatus.

A typical snap line apparatus is depicted in FIG. 1. The apparatus 10 includes a housing 12 for holding powdered material and an access door 14 through which powdered material may be added without having to dismantle the housing. The apparatus also has a rotatable handle 16 that may be pivoted between storage and use positions. The handle 16 is operatively connected to a reel (not shown) about which a line 20 is wound. The line 20 includes an attachment ring 22, which is configured to facilitate attachment of the line 20 to a suitably positioned fastening element (also not shown).

The powdered material used in snap lines is usually available in bulk as a stand-alone product. In addition, powdered material is packaged in differently sized containers, of which a common size is 8-ounces. While the preferred powdered material used in the present invention comprises chalk and/or cementitious dye, it is understood that other powdered materials may be used without departing from the spirit and scope of the invention.

Figure 2:
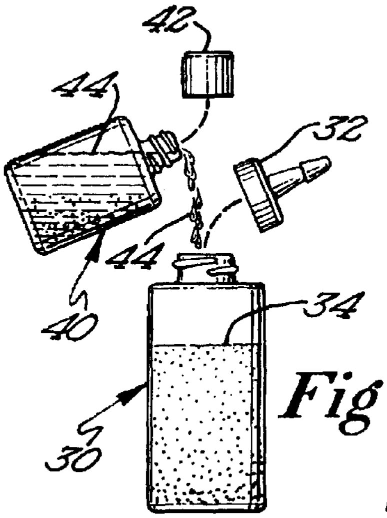
FIG. 2 is an illustration depicting a method by which powdered material of the present invention may be treated.

A process by which an improved powdered material may be treated is shown in FIG. 2. In the figure, a container 30 is depicted as having a cap 32, which has been removed to expose the powdered material 34 contained therein. Another container 40 is also depicted as having its cap 42 removed to expose water resistant material 44 contained therein. As shown, the water resistant material 44 is added to the container 30. After an effective amount of water resistant material 44 has been added, and prior to mixing, the container 30 may be closed by reattaching the cap 32. Although the treated powdered material may be produced using any one of a number of water resistant materials, it is preferred that the water resistant materials are silicone based. More preferably, it has been discovered that a particularly effective silicone-based water resistant material is sold by KIWI Brands under the name of Cavalier® Protect-All™.

Figure 3:
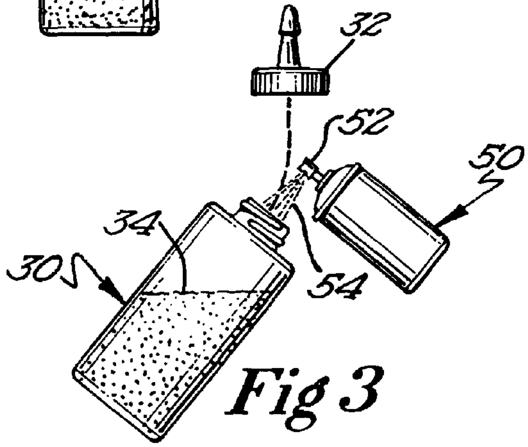
FIG. 3 is another illustration depicting another method by which powdered material of the present invention may be treated.

FIG. 3 illustrates another process by which an improved powdered material may be treated. Here, a container 30 is depicted as having a cap 32, which has been removed to expose the powdered material 34 contained therein. Another container 50 is depicted as having a nozzle 52, which directs water resistant material 54 (preferably Cavalier® Protect-All™) in a predetermined direction as it is expelled or propelled from the container 50. As shown, the water resistant material 54 is added to the container 30 by directing the water resistant material onto the powdered material. Preferably, enough water resistant material is applied to the powdered material so that the surface is effectively coated. Then, the cap 32 is replaced, and the container is agitated. Then, the cap 32 is removed and the steps of spraying, capping, and agitating are repeated until substantially all of the powdered material 34 has been treated.

As will be understood, the effective amount of water resistant material added to a container of powdered material will depend upon the size of the container. However, with an 8 (eight) ounce container of powdered material, it has been determined that an effective amount of water resistant material is in the range of about 0.5 to 4.0 ounces, and preferably in the range of about 1.0 to 3.0 ounces. It will also be understood that the aforementioned effective amount may differ between powdered materials manufactured by different companies, which may produce their powdered materials according to their own formulae, and manufacturing standards. Note that effective amounts may also be influenced by environmental conditions.

Figure 4:
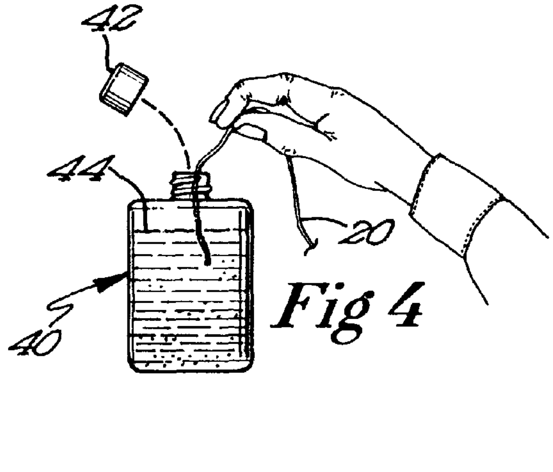
FIG. 4 is an illustration depicting a method by which a snap line of the present invention may be treated.

FIG. 4 illustrates a process by which an improved snap line is treated. Here, a container 40 is depicted as having its cap 42 removed to expose water resistant material 44 contained therein. A line 20 is then added to the container 40 so that it may be sufficiently coated. After the line 20 has been sufficiently coated, it is removed and allowed to air dry, or dried by applying gentle heat. Alternatively, water resistant material may be applied to a line 20 by spraying the water resistant material directly onto the line (similar to the method of application as taught in FIG. 3).

Figure 5:
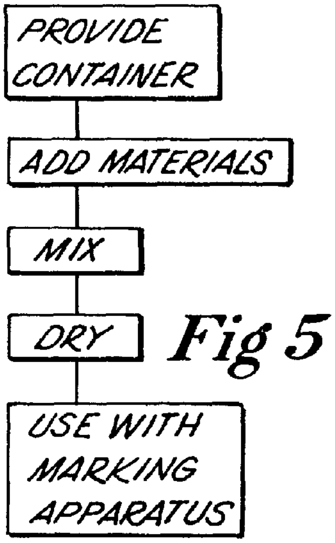
FIG. 5 is a schematic representation of process steps by which powdered material of the present invention may be treated; and, FIG. 6 is a schematic representation of process steps by which an improved snap line may be treated.

FIG. 5 illustrates a preferred method by which an improved powdered material may be treated. For this, a separate container may be provided, although it is preferred to use the container in which the powdered material was originally packaged. Then, the water resistant material is added to the container. As mentioned above, for an 8-ounce container, an effective amount of water resistant material is in the range of about 0.5 to 4.0 ounces, and preferably in the range of about 1.0 to 3.0 ounces. Then, the powdered material and the water resistant material are mixed. This can be achieved in numerous ways, such as, for example, by stirring, agitating, or by capping the container and vigorously shaking the container. Then, the mixture is dried. This step, too, can be achieved in numerous ways. For instance, the mixture could be allowed to air dry, or it could be gently heated. Finally, the mixture is combined with a snap line by adding it to a snap line apparatus.

It will be appreciated that the improved powdered material may be produced in a third container, if desired. In this variation, the water resistant material may be added first and then the powdered material may be added.

Figure 6:
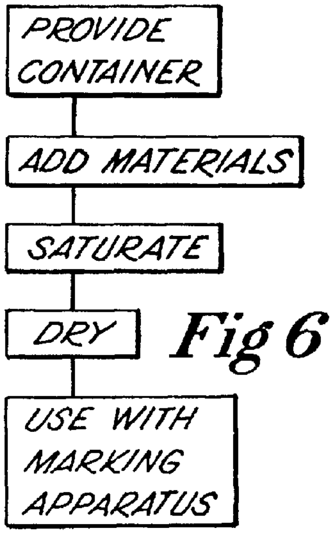

FIG. 6 illustrates a preferred method by which an improved snap line may be treated. For this, a separate container may be provided, although it is preferred to use the container in which the water resistant material was originally packaged. Then, the line is added to the container so that it is effectively coated. Then, the line is withdrawn from the container and dried. This can be achieved in a number of ways. For example, by air-drying, by forced air-drying, or by gently heating. Finally, the improved line installed into a snap line apparatus, where it may be combined with the improved powdered material.

It will be appreciated that the improved snap line may also be treated in a third container, if desired. In this variation, the untreated line may be added first and then the water resistant material may be added.

While preferred embodiments of the present invention have been shown and described, it should be understood that various changes, adaptations, and modifications may be made therein without departing from the spirit of the invention. For example, it is envisioned that the water repellency could be provided by polytetrafluoroethylene. Changes may be made in details, particularly in matters of shape, size, material, and arrangement of parts without exceeding the scope of the invention. Accordingly, the scope of the invention is as defined in the language of the appended claims.

What is claimed is:

1. A method of treating particles of powdered material suitable for use with a snap line, the method comprising the steps of:

a) providing a container of powdered material;

b) applying a water resistant liquid material to the powdered material as the powdered material resides within the container;

c) agitating the container; and, d) drying the powdered material.

2. The method of claim 1, wherein the step of applying a water resistant material to the powdered material comprises the step of:

i) spraying the water resistant material onto the powdered material.

3. The method of claim 1, wherein the step of applying a water resistant material to the powdered material comprises the step of:

i) pouring the water resistant material onto the powdered material.

4. The method of claim 1, wherein the powdered material comprises chalk.

5. The method of claim 1, wherein the powdered material comprises a mixture of chalk and coloring dye.

6. The method of claim 1, wherein the water resistant material includes silicone.

7. A method of marking a surface; the method comprising the steps of:

a) providing a snap line device having housing, an interior and a flexible line a substantial portion of which is positioned in the interior, with the flexible line suitable for receiving and transferring powdered material from a surface of the line to a secondary surface in an impacting manner;

b) providing the interior of the snap line device with a quantity of powdered material that has been treated with a silicone based water repellant material;

c) extending a portion of the flexible line from the housing so that it is held under tension in close proximity to and generally parallel with the secondary surface; and d) drawing the flexible line away from the secondary surface and releasing the line whereby the line snaps against the secondary surface and transfers at least a portion of the powdered material thereto.

8. The method of claim 7, wherein a substantial portion of the flexible line has been provided with a water resistant coating prior to receiving the powdered material.

9. The method of claim 7, wherein the powdered material comprises chalk.

10. The method of claim 7, wherein the powdered material comprises a coloring dye.

11. The method of claim 7, wherein the powdered material comprises a mixture of chalk and coloring dye.

12. A snap line apparatus comprising a body having an interior and a flexible line positionable at least in part within said interior, the flexible line being secured to the body within the interior; wherein the flexible line is suitable for receiving and transferring powdered material from a surface of the line to a secondary surface in an impacting manner, the flexible line including at least one strand of material that has been coated with water resistant material prior to receiving the powdered material.

13. The snap line apparatus of claim 12, wherein the water resistant material comprises silicone.

14. The snap line apparatus of claim 12, wherein the powdered material comprises chalk.

15. The snap line apparatus of claim 12, wherein the powdered material comprises a coloring dye.

16. The snap line apparatus of claim 12, wherein the powdered material comprises a mixture comprising chalk and a coloring dye.

17. The snap line apparatus of claim 16, wherein the coloring dye is concrete dye.

18. A method of treating powdered material suitable for use with a snap line, the method comprising the steps of:

a. providing a container of powdered material;

b. applying a water resistant liquid material to the powdered material as the powdered material resides within the container; and c. drying the powdered material.

19. The method of treating powdered material claim 18, wherein the step of applying a water resistant material to the powdered material comprises the step of spraying the water resistant material onto the powdered material.

20. The method of treating powdered material of claim 18, wherein the powdered material comprises chalk.

21. The method of treating powdered material of claim 18, wherein the powdered material comprises a mixture of chalk and coloring dye.

* * * * *